United States Patent
Kakinuma et al.

(10) Patent No.: US 10,866,693 B2
(45) Date of Patent: Dec. 15, 2020

(54) DISPLAY CONTROL DEVICE FOR SELECTING A DISPLAYED ITEM BASED ON INPUT OF A TOUCH OPERATION

(71) Applicants: TOYOTA JIDOSHA KABUSHIKI KAISHA, Toyota (JP); AISIN AW CO., LTD., Anjo (JP); Panasonic Corporation, Kadoma (JP); Harman International Industries, Incorporated, Stamford, CT (US)

(72) Inventors: Shoji Kakinuma, Okazaki (JP); Kensuke Hanaoka, Toyota (JP); Yusuke Takeuchi, Miyoshi (JP); Satoru Akashi, Kawagoe (JP); Yoshito Momiyama, Chita (JP); Kazuyuki Ueda, Okazaki (JP); Kazuhiro Kamiya, Okazaki (JP); Hitoshi Araki, Yokohama (JP); Kentaro Kakuse, Toyota (JP)

(73) Assignees: TOYOTA JIDOSHA KABUSHIKI KAISHA, Toyota (JP); AISIN AW CO., LTD., Anjo (JP); PANASONIC CORPORATION, Kadoma (JP); HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 338 days.

(21) Appl. No.: 15/821,413

(22) Filed: Nov. 22, 2017

(65) Prior Publication Data

US 2018/0150190 A1    May 31, 2018

(30) Foreign Application Priority Data

Nov. 25, 2016 (JP) .................................. 2016-229555

(51) Int. Cl.
*G06F 3/0482* (2013.01)
*G06F 3/0488* (2013.01)
(Continued)

(52) U.S. Cl.
CPC ........ *G06F 3/0482* (2013.01); *G06F 3/03547* (2013.01); *G06F 3/0488* (2013.01); *G06F 3/04812* (2013.01); *G06F 3/04883* (2013.01)

(58) Field of Classification Search
CPC ............. G06F 3/03547; G06F 3/04812; G06F 3/0482; G06F 3/0488; G06F 3/04883
See application file for complete search history.

(56) References Cited

U.S. PATENT DOCUMENTS 5,565,887 A    10/1996   McCambridge et al.
5,757,358 A *  5/1998   Osga ................... G06F 3/04842
                                                        345/157
(Continued)

FOREIGN PATENT DOCUMENTS

CN       1434935 A     8/2003
EP       1 111 497 A1  6/2001
(Continued)

*Primary Examiner* — Tan H Tran
(74) *Attorney, Agent, or Firm* — Oliff PLC

(57) ABSTRACT

A display control device includes an operation information acquisition unit and a cursor coordinate controller. The cursor coordinate controller is configured to, in a state in which a cursor is set to a predetermined selection item, when operation information is acquired from the operation information acquisition unit, and when, based on a position of the cursor on a display surface of a display device, the selection item is included in a search area that is set in a direction corresponding to an operation direction included in the operation information on the display surface, select the selection item at a position closest to a reference point of the cursor in the direction corresponding to the operation direc- (Continued)

tion as the selection item to be a movement destination of the cursor.

5 Claims, 5 Drawing Sheets

(51) Int. Cl.
*G06F 3/0354* (2013.01)
*G06F 3/0481* (2013.01)

(56) References Cited

U.S. PATENT DOCUMENTS

| | | |
|---|---|---|
| 2004/0104940 A1 | 6/2004 | Giacomelli |
| 2006/0168548 A1 | 7/2006 | Kelley et al. |
| 2011/0302532 A1* | 12/2011 | Missig .................. G06F 3/0416 715/823 |
| 2012/0262403 A1 | 10/2012 | Tissot |
| 2013/0125066 A1* | 5/2013 | Klein .................. G06F 3/04812 715/862 |
| 2013/0176256 A1 | 7/2013 | Hara |
| 2015/0009177 A1* | 1/2015 | Yamamoto ............ G06F 3/0414 345/174 |
| 2015/0084965 A1* | 3/2015 | Hsu ..................... G06F 3/04812 345/443 |
| 2017/0068420 A1* | 3/2017 | Hsueh ................ G06F 3/04842 |

FOREIGN PATENT DOCUMENTS

| | | |
|---|---|---|
| JP | 2003-345494 A | 12/2003 |
| JP | 2008-077651 A | 4/2008 |
| JP | 2010-176426 A | 8/2010 |
| JP | 2013-515309 A | 5/2013 |
| JP | 2016-042252 A | 3/2016 |
| WO | 0148586 A2 | 7/2001 |
| WO | 2013/088559 A1 | 6/2013 |

* cited by examiner

WHEN L1 < L2, CORRECT AS MOVEMENT
IN HORIZONTAL DIRECTION
(AMOUNT OF MOVEMENT = |X2 − X1|)

(AT OPERATION TO RIGHT)

SELECT SELECTION ITEM "A"

(AT OPERATION TO RIGHT)

SELECT SELECTION ITEM "D"

(AT OPERATION TO RIGHT)

SELECT SELECTION ITEM "E"

(AT MOVEMENT TO RIGHT)

SEARCH ORDER
(AREA A → AREA B → AREA C)

CURSOR JUMPING OCCURS

NO CURSOR JUMPING OCCURS

DISPLAY CONTROL DEVICE FOR SELECTING A DISPLAYED ITEM BASED ON INPUT OF A TOUCH OPERATION

INCORPORATION BY REFERENCE

The disclosure of Japanese Patent Application No. 2016-229555 filed on Nov. 25, 2016 including the specification, drawings and abstract is incorporated herein by reference in its entirety.

BACKGROUND

1. Technical Field

The present disclosure relates to a display control device that controls selection of selection items displayed on a display device.

2. Description of Related Art

In the related art, an operation device that performs selection of selection items displayed on a display device, such as a display of a navigation device, with a remote operation through an operation on a touch pad at a position easily operable by an occupant of a vehicle is known (for example, WO 2013/88559).

The operation device has, as an operation mode, an absolute coordinate mode and a relative coordinate mode. The absolute coordinate mode is an operation mode in which a coordinate system of a display surface of the display device is absolutely synchronized with a coordinate system of an operation surface of the touch pad, and an operation position of the touch pad matches a position of a cursor displayed on the display device. The relative coordinate mode is an operation mode in which a coordinate system of a screen of the display device is relatively synchronized with a coordinate system of a screen of the touch pad, the operation position of the touch pad does not necessarily match the position of the cursor displayed on the display device, and the amount of movement of the cursor displayed on the display device is specified according to an operation amount of the touch pad.

Then, in a state in which the position of the cursor displayed on the display device does not match a position of any item, the operation device operates in the absolute coordinate mode. With this, it is possible to allow the occupant of the vehicle to intuitively select a desired selection item through an operation on the touch pad. When the position of the cursor displayed on the display device matches a position of a specific selection item, the operation device operates in the relative coordinate mode. In this case, even when the occupant of the vehicle removes a finger from the operation surface of the touch pad once and restarts an operation from a different position of the operation surface, a selection item at the position of the cursor before the finger is removed is selected as an initial operation target. For this reason, the occupant of the vehicle continuously touches an arbitrary position of the operation surface of the touch pad, thereby continuously selecting the same selection item at the position of the cursor.

SUMMARY

However, in the operation device described in WO 2013/88559, even in any of the absolute coordinate mode and the relative coordinate mode, when selection of selection items is performed, the operation position or the operation amount of the touch pad needs to be adjusted such that the position of the cursor matches a position of a selection item to be selected. For this reason, when a driver performs an operation on the touch pad, in particular, during traveling of the vehicle, there is a demand for improvement of operability of the touch pad.

The disclosure provides a display control device capable of improving operability relating to selection of selection items displayed on a display device.

An aspect of the disclosure relates to a display control device that controls selection of selection items displayed on a display device disposed remotely from a touch operation unit based on operation information input from the touch operation unit. The display control device includes an operation information acquisition unit and a cursor coordinate controller. The operation information acquisition unit is configured to acquire an operation direction of the touch operation unit as the operation information from the touch operation unit. The cursor coordinate controller is configured to, based on the operation information acquired from the operation information acquisition unit, select a selection item from among the selection items displayed on the display device and set a cursor for designating an operation target to the selected selection item. The cursor coordinate controller is configured to, in a state in which the cursor is set to a predetermined selection item, when the operation information is acquired from the operation information acquisition unit, and when, based on a position of the cursor on a display surface of the display device, the selection item is included in a search area that is set in a direction corresponding to the operation direction included in the operation information on the display surface, select the selection item at a position closest to a reference point of the cursor in the direction corresponding to the operation direction as the selection item to be a movement destination of the cursor.

According to the aspect of the disclosure, when the position of the cursor displayed on the display device is moved through an operation on the touch operation unit, the selection item to be the movement destination of the cursor is selected based on the positional relationship between the direction corresponding to the operation direction of the touch operation unit on the display surface of the display device and each selection item displayed on the display device. For this reason, there is no need to adjust the operation amount of the touch operation unit in selecting the selection item to be the movement destination of the cursor. With this, it is possible to improve operability when selecting the selection item to be the movement destination of the cursor through the operation on the touch operation unit.

In the display control device according to the aspect of the disclosure, the cursor coordinate controller may be configured to, when there is a plurality of selection items at the position closest to the reference point of the cursor in the operation direction, calculate a distance on the display surface between the reference point of the cursor and the selection item in a direction perpendicular to the direction corresponding to the operation direction on the display surface for the selection items and select the selection item at the shortest calculated distance as the selection item to be the movement destination of the cursor.

According to the aspect of the disclosure, based on the direction corresponding to the operation direction of the touch operation unit on the display surface of the display device, even when there is a plurality of candidates of the selection item to be the movement destination of the cursor, it is possible to select the selection item to be the movement destination of the cursor from among the selection items based on the positional relationship of the selection items in the direction perpendicular to the direction corresponding to the operation direction.

In the display control device according to the aspect of the disclosure, the cursor coordinate controller may be configured to, when there is a plurality of selection items at the shortest distance from the reference point of the cursor in the direction perpendicular to the direction corresponding to the operation direction on the display surface, set an origin of the cursor to a position different from the reference point in the direction perpendicular to the direction corresponding to the operation direction on the display surface for the selection items and select the selection item at the shortest distance on the display surface from the origin of the cursor in the direction perpendicular to the direction corresponding to the operation direction as the selection item to be the movement destination of the cursor.

According to the aspect of the disclosure, when even the positional relationship of the selection items in the direction perpendicular to the direction corresponding to the operation direction, as well as in the direction corresponding to the operation direction of the touch operation unit on the display surface of the display device, is taken into consideration, even when there is a plurality of candidates of the selection item to be the movement destination of the cursor, it is possible to select the selection item to be the movement destination of the cursor from among the selection items based on the positional relationship between the origin of the cursor and the selection item.

In the display control device according to the aspect of the disclosure, the cursor coordinate controller may be configured to, when there is a plurality of selection items at the position closest to the reference point of the cursor in the operation direction, select the selection item positioned in a direction set in advance in a direction perpendicular to the direction corresponding to the operation direction on the display surface as the selection item to be the movement destination of the cursor for the selection items.

In the display control device according to the aspect of the disclosure, a display area of the selection items may be divided into a plurality of display areas in the display device. The cursor coordinate controller may be configured to, when, based on the position of the cursor on the display surface of the display device, a search area that is set in the direction corresponding to the operation direction on the display surface extends over the display areas, and when, among the display areas, the display area on a side on which the cursor is positioned is a first display area and the display area on a side on which the cursor is not positioned is a second display area, move the position of the cursor from the first display area to the second display area under a condition that there is no selection item included in the search area among the selection items displayed in the first display area.

According to the aspect of the disclosure, when the search area that is set in the direction corresponding to the operation direction of the touch operation unit based on the cursor extends over the display areas, it is possible to suppress movement of the position of the cursor over the display areas against an operator's intention.

In the display control device according to the aspect of the disclosure, the cursor coordinate controller may be configured to, when the position of the cursor is moved from the first display area to the second display area, determine presence or absence of the selection item from an area where the search area and the second display area overlap each other, and when determination is made that no selection item is included, determine the presence or absence of the selection item from other areas of the second display area.

According to the aspect of the disclosure, when the position of the cursor moves over the display areas, even when the position of the cursor in a display area before movement is slightly deviated from a position of a selection item intended by the operator in a display area after movement in the direction perpendicular to the direction corresponding to the operation direction of the touch operation unit, a phenomenon, so-called cursor jumping, in which the position of the cursor jumps over the selection item intended by the operator hardly occurs. With this, it is possible to improve operability when selecting the selection item to be the movement destination of the cursor through the operation on the touch operation unit while increasing the degree of freedom for the layout of the selection items displayed on the display device.

In the display control device according to the aspect of the disclosure, the cursor coordinate controller may be configured to perform the determination regarding the presence or absence of the selection item in the second display area for each of a plurality of areas set by dividing the second display area in a direction perpendicular to the direction corresponding to the operation direction, and when the position of the cursor is moved from the first display area to the second display area, determine the presence or absence of the selection item in order from an area at a position close to the area where the search area and the second display area overlap each other in the direction perpendicular to the direction corresponding to the operation direction.

According to the aspect of the disclosure, when the position of the cursor moves over the display areas, it is possible to perform selection of a selection item in a display area after movement in order from an area that is highly likely to conform to the operator's intention.

In the display control device according to the aspect of the disclosure, the operation information acquisition unit may be configured to acquire an operation amount in a first direction and an operation amount in a second direction intersecting the first direction from the touch operation unit and output a direction corresponding to a relatively large operation amount out of the operation amounts in the first and second directions as the direction corresponding to the operation direction of the touch operation unit to the cursor coordinate controller.

According to the aspect of the disclosure, even when an operation on the touch operation unit is slightly shifted, since a restriction is applied to the direction output to the cursor coordinate controller as the direction corresponding to the operation direction of the touch operation unit on the display surface of the display device, it is possible to allow the operator to intuitively perform the movement of the cursor displayed on the display device.

The above-described configuration is particularly suitable for combination with a configuration in which, when the position of the cursor moves from the first display area to the second display area, the presence or absence of a selection item is determined from areas of the second display area other than the area where the search area and the second display area overlap each other. According to the combination with the above-described configuration, even when the restriction is applied to the direction output to the cursor coordinate controller as the direction corresponding to the operation direction of the touch operation unit on the display surface of the display device, a phenomenon, so-called cursor jumping, in which, when the display area of the display device is divided into a plurality of display areas, the cursor jumps over a selection item intended by the operator in a display area after movement hardly occurs. For this reason, it is possible to intuitively perform the movement of the cursor displayed on the display device while increasing the degree of freedom for the layout of the selection items displayed on the display device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment of a display control device will be described. The display control device of the embodiment is a device that, when a touch pad (an example of a touch operation unit) at a position easily operable by an occupant of a vehicle is operated, controls selection of selection items displayed on a display device according to operation information including an operation position or an operation direction of the touch pad.

Figure 1:
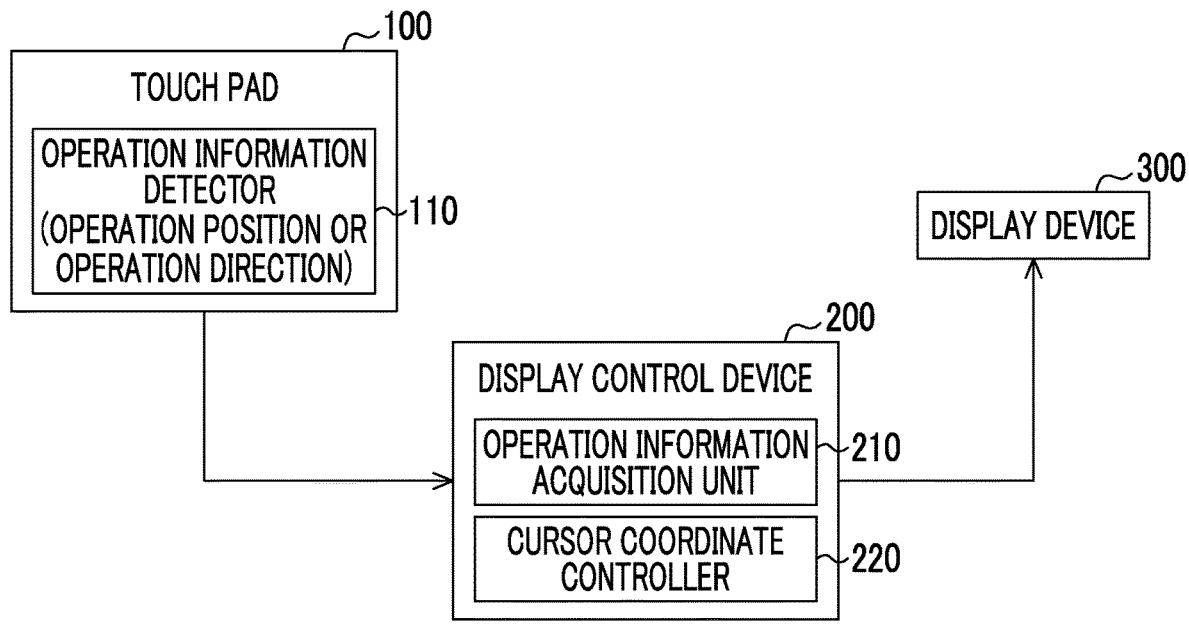
FIG. 1 is a block diagram showing the schematic configuration of a first embodiment of a display control device.

Specifically, as shown in FIG. 1, a touch pad 100 has an operation information detector 110 that detects a touch operation by the occupant of the vehicle. The operation information detector 110 is constituted of, an electrostatic sensor, and monitors the amount of electric charge charged in each position of an operation surface of the touch pad 100. The amount of electric charge charged in a surface portion touched with a finger of the occupant of the vehicle out of the operation surface of the touch pad 100 becomes larger than other surface portions. For this reason, the operation information detector 110 calculates position coordinates out of the operation surface of the touch pad 100 having the amount of change in electric charge equal to or greater than a predetermined threshold as position coordinates of the surface portion touched with the finger of the occupant of the vehicle out of the operation surface of the touch pad 100. At this time, the operation information detector 110 calculates position coordinates when the occupant of the vehicle touches the operation surface of the touch pad 100, as position coordinates of an operation start. The operation information detector 110 calculates position coordinates when the occupant of the vehicle slides the finger on the operation surface of the touch pad 100 and removes the finger from the operation surface, as position coordinates of an operation end. Then, the operation information detector 110 calculates a direction of a vector toward the position coordinates of the operation end with the position coordinates of the operation start as a starting point, as the operation direction of the touch pad 100 by the occupant of the vehicle.

A display control device 200 acquires information relating to the operation position and the operation direction of the touch pad 100 input from the operation information detector 110 of the touch pad 100 as operation information through an operation information acquisition unit 210. Then, the operation information acquisition unit 210 performs coordinate conversion of the position coordinates of the operation position of the touch pad 100 to a coordinate system of a display surface of a display device 300 based on the operation information acquired from the touch pad 100.

Figure 2:
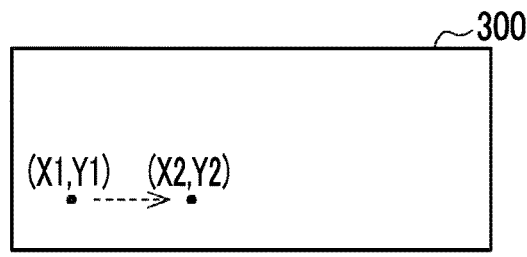
FIG. 2 is a schematic view showing an example of synchronous operation between a touch pad and a display device that is executed by the display control device of the first embodiment.
Figure 2:
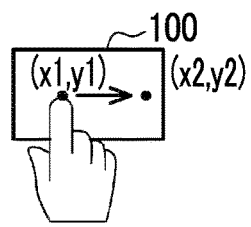

In an example shown in FIG. 2, the position coordinates of the operation start of the touch pad 100 are (x1,y1), and the position coordinates of the operation end of the touch pad 100 are (x2,y2). At this time, the operation information acquisition unit 210 calculates (X1,Y1) as position coordinates in the coordinate system of the display surface of the display device 300 corresponding to the position coordinates (x1,y1) of the operation start of the touch pad 100. Similarly, the operation information acquisition unit 210 calculates (X2,Y2) as position coordinates in the coordinate system of the display surface of the display device 300 corresponding to the position coordinates (x2,y2) of the operation end of the touch pad 100.

At this time, the operation information acquisition unit 210 may perform coordinate conversion of the operation position of the touch pad 100 in a so-called absolute coordinate mode that is an operation mode in which the coordinate system of the operation surface of the touch pad 100 is absolutely synchronized with the coordinate system of the display surface of the display device 300. The operation information acquisition unit 210 may perform coordinate conversion of the operation position of the touch pad 100 in a relative coordinate mode that is an operation mode in which the coordinate system of the operation surface of the touch pad 100 is relatively synchronized with the coordinate system of the display surface of the display device 300.

Figure 3:
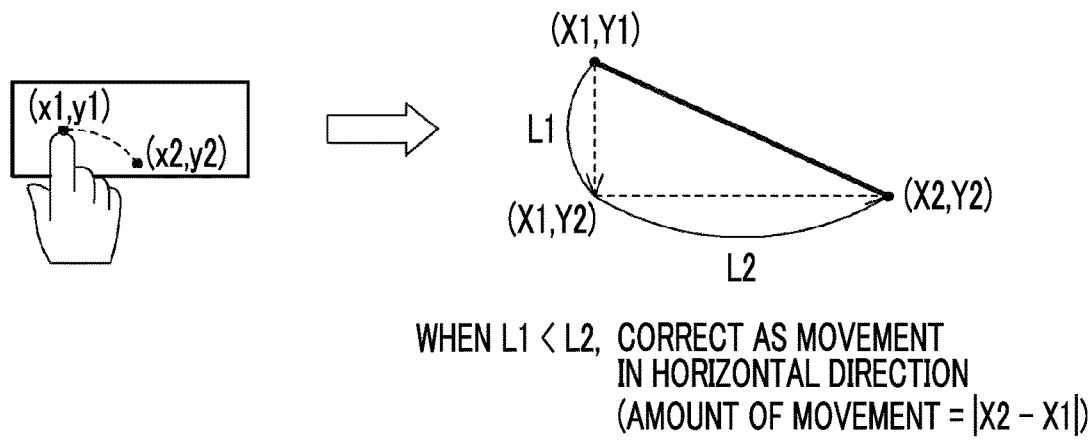
FIG. 3 is a schematic view illustrating a process of correcting an operation direction of the touch pad.

As shown in FIG. 3, when the operation direction of the touch pad 100 is inclined obliquely, the operation information acquisition unit 210 separates a vector connecting the position coordinates after coordinate conversion into a component in an up-down direction and a component in a right-left direction. Then, the operation information acquisition unit 210 compares the magnitude of the components in the up-down direction and the right-left direction, corrects the direction corresponding to a relatively large component as the operation direction of the touch pad 100, and corrects the relatively large components as an operation amount of the touch pad 100. In an example shown in the drawing, the position coordinates after coordinate conversion corresponding to the position coordinates of the operation start of the touch pad 100 are (X1,Y1), and the position coordinates after coordinate conversion corresponding to the position coordinates of the operation end of the touch pad 100 are (X2,Y2). At this time, in a vector toward the position coordinates (X2,Y2) with the position coordinates (X1,Y1) as a starting point, the component (=|X2−X1|) in the right-left direction is greater than the component L1 (=|Y2−Y1|) in the up-down direction. With this, the operation information acquisition unit 210 corrects the operation direction of the touch pad 100 as movement in a right direction, and corrects the operation amount of the touch pad 100 as the component (=|x2−x1|) in the right-left direction.

The operation information acquisition unit 210 outputs the position coordinates of the operation position of the touch pad 100 obtained by coordinate conversion as described above to the cursor coordinate controller 220. The cursor coordinate controller 220 ascertains information relating to the position and size of each of the selection items displayed on the display device 300. The selection items are virtual operation buttons that are realized on the display surface of the display device 300, and for example, operation buttons for performing various settings of a navigation device, operation buttons for performing various settings of an air-conditioning device, operation buttons for performing various settings of an audio or a television, and the like are exemplified as an example. Then, when a cursor for designating an operation target on the display surface of the display device 300 is not set, the cursor coordinate controller 220 determines a selection item corresponding to the position coordinates of the operation end of the touch pad 100 with reference to the position coordinates of the operation end of the touch pad 100 after coordinate conversion input from the operation information acquisition unit 210 and the position and size of each of the selection items displayed on the display device 300. The cursor coordinate controller 220 sets the cursor to the determined selection item. The cursor has a shape along an outer edge of an image of a selection item displayed on the display device 300. The cursor coordinate controller 220 sets a predetermined position in the cursor, for example, a center position of the cursor, as a reference point. The cursor coordinate controller 220 selects a selection item to be a movement destination of the cursor from among the selection items displayed on the display device 300 based on the operation direction of the touch pad 100 input from the operation information acquisition unit 210.

Figure 4A:
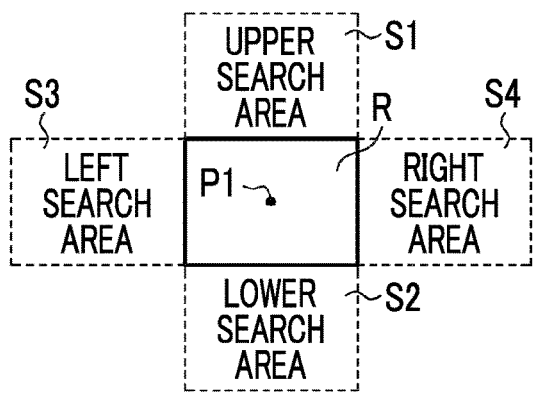
FIG. 4A is a schematic view illustrating a positional relationship of search areas based on a position of a cursor.

Specifically, as shown in FIG. 4A, the cursor coordinate controller 220 sets an upper search area S1, a lower search area S2, a right search area S4, and a left search area S3 at adjacent positions in four directions of up, down, right, and left when viewed from a cursor R. In an example shown in the drawing, the search areas S1 to S4 have a rectangular shape that is the same shape as the cursor R, and the area thereof is the same as that of the cursor R. Then, the cursor coordinate controller 220 determines whether or not a selection item is included in the search areas S1 to S4 positioned in the corresponding directions according to the operation direction of the touch pad 100 input from the operation information acquisition unit 210. At this time, not only when all of the selection items are included in the search areas S1 to S4 as a target of determination, but also when solely a part of the selection items is included in the search areas S1 to S4, the cursor coordinate controller 220 determines that a selection item is included in the search areas S1 to S4. Then, when no selection item is included in the search areas S1 to S4 as a target of determination, the cursor coordinate controller 220 switches an area adjacent to a search area in the operation direction of the touch pad 100 as a new search area, and then, determines the presence or absence of a selection item. Thereafter, the cursor coordinate controller 220 repeats the switching of a search area and the determination regarding the presence or absence of a selection item as long as there is a space within the display surface of the display device 300. When solely one selection item is included in a search area as a target of determination, the cursor coordinate controller 220 selects the selection item as the selection item to be the movement destination of the cursor R. When a plurality of selection items is included in a search area as a target of determination, the cursor coordinate controller 220 selects the selection item to be the movement destination of the cursor R according to procedures of (A) to (C) described below from among the selection items. (A): Select a selection item closest to the position coordinates of the reference point of the cursor R in the operation direction of the touch pad 100. (B): When there is a plurality of selection items corresponding to (A), select a selection item closest to the position coordinates of the reference point of the cursor R in a direction perpendicular to the operation direction of the touch pad 100 among the selection items. (C): When there is a plurality of selection items corresponding to (B), select a selection item closest to the position coordinates of the origin of the cursor R in the direction perpendicular to the operation direction of the touch pad 100 among the selection items.

Figure 4B:
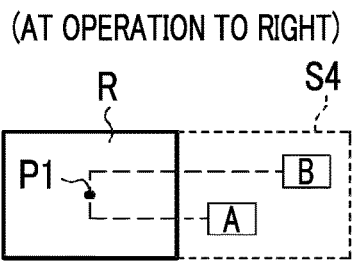
FIG. 4B is a schematic view illustrating the outline of item selection processing when a plurality of selection items is included in a search area.

Specifically, in an example shown in FIG. 4B, when the operation direction of the touch pad 100 is the right direction, it is assumed that two selection items "A", "B" are included in the right search area S4. In the example, the selection items "A", "B" are at different distances from position coordinates P1 of the reference point of the cursor R in the right-left direction to be the operation direction of the touch pad 100. For this reason, the cursor coordinate controller 220 selects the selection item "A" at a relatively short distance from the position coordinates P1 of the reference point of the cursor R in the right-left direction to be the operation direction of the touch pad 100 out of the selection items as the movement destination of the cursor R according to the procedure (A).

Figure 4C:
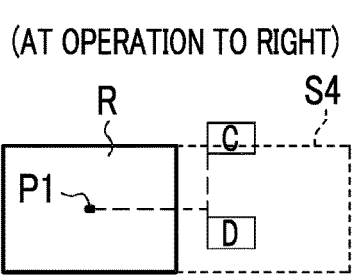
FIG. 4C is a schematic view illustrating the outline of the item selection processing when a plurality of selection items is included in a search area.

In an example shown in FIG. 4C, similarly, when the operation direction of the touch pad 100 is the right direction, it is assumed that two selection items "C", "D" are included in the right search area S4. In the example, the selection items "C", "D" are at the same distance from the position coordinates P1 of the reference point of the cursor R in the right-left direction to be the operation direction of the touch pad 100. For this reason, the cursor coordinate controller 220 selects the selection item "D" at a relatively short distance from the position coordinates P1 of the reference point of the cursor R in the direction perpendicular to the operation direction of the touch pad 100 out of the selection items "C", "D" as the movement destination of the cursor R according to the procedure (B).

Figure 4D:
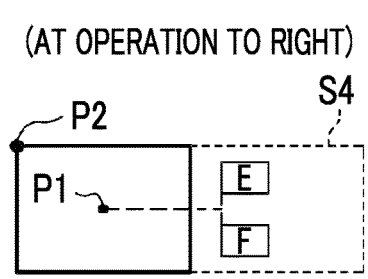
FIG. 4D is a schematic view illustrating the outline of the item selection processing when a plurality of selection items is included in a search area.

Even in an example shown in FIG. 4D, similarly, when the operation direction of the touch pad 100 is the right direction, it is assumed that two selection items "E", "F" are included in the right search area S4. In the example, the selection items "E", "F" are at the same distance from the position coordinates P1 of the reference point of the cursor R in the right-left direction to be the operation direction of the touch pad 100. The selection items "E", "F" are at the same distance from the position coordinates P1 of the reference point of the cursor R even in the direction perpendicular to the operation direction of the touch pad 100. For this reason, the cursor coordinate controller 220 selects the selection item "E" at a relatively short distance from position coordinates P2 of the origin of the cursor R set at the upper left corner of the cursor R in the direction perpendicular to the operation direction of the touch pad 100 as the movement destination of the cursor R out of the selection items "E", "F" according to the procedure (C).

Then, for example, in a state in which a predetermined selection item is selected by the cursor R, in a case where a decision operation of the selection item, such as a press operation by the occupant of the vehicle on the operation surface of the touch pad 100, is performed, the display control device 200 executes an operation of the vehicle indicated by the selection item.

Figure 5:
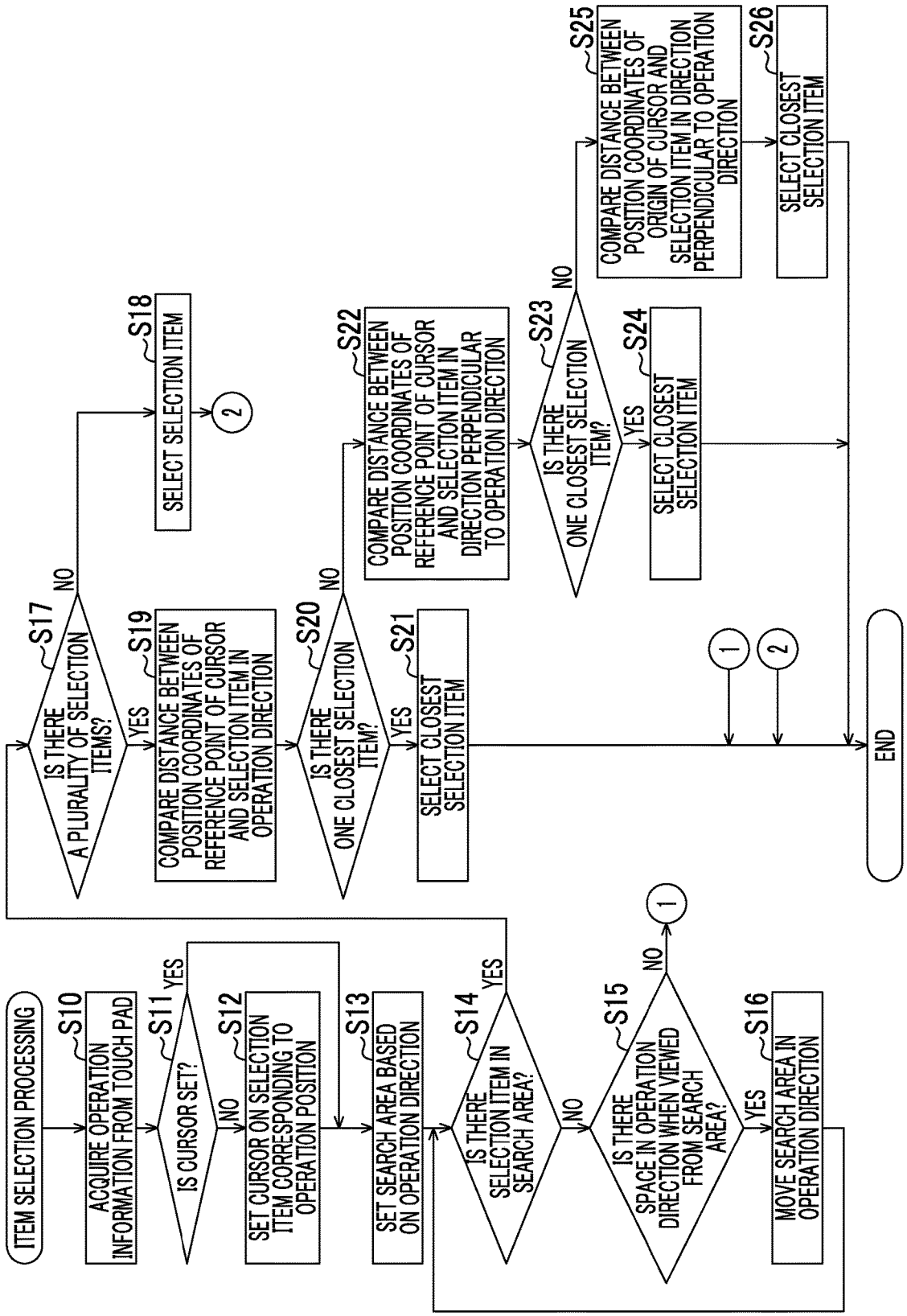
FIG. 5 is a flowchart showing a processing content of the item selection processing that is executed by the display control device of the first embodiment.

Next, a specific processing procedure of item selection processing that is executed by the display control device 200 of the embodiment will be described. As shown in FIG. 5, the display control device 200 first acquires the operation information including the operation position and the operation direction of the touch pad 100 from the touch pad 100 through the operation information acquisition unit 210 (Step S10).

When the cursor is not set to a selection item displayed on the display device 300 (Step S11=NO), the display control device 200 sets the cursor to a selection item corresponding to the operation position of the touch pad 100 acquired in previous Step S10 among the selection items displayed on the display device 300 through the cursor coordinate controller 220 (Step S12). When the cursor is set to a predetermined selection item among the selection items displayed on the display device 300 (Step S11=YES), the display control device 200 progresses the processing to Step S13 without passing through the processing of Step S12.

Next, the display control device 200 sets a search area based on the cursor according to the operation direction of the touch pad 100 acquired in previous Step S10 through the cursor coordinate controller 220 (Step S13).

Next, the display control device 200 determines whether or not a selection item is included in the search area set in previous Step S13 through the cursor coordinate controller 220 (Step S14).

Then, when determination is made that no selection item is included in the search area (Step S14=NO), the display control device 200 determines whether or not there is a space in the operation direction of the touch pad 100 within the display surface of the display device 300 when viewed from the search area at the present time through the cursor coordinate controller 220 (Step S15).

When determination is made that there is a space in the operation direction of the touch pad 100 (Step S15=YES), the display control device 200 moves a search area in the operation direction of the touch pad 100 (Step S16), and returns the processing to Step S14.

Then, while determination is made that no selection item is included in the search area (Step S14=NO), the display control device 200 repeats the processing of previous Steps S15 and S16. Then, in a process of repeating the processing of Steps S15 and S16, when determination is made that there is no space in the operation direction of the touch pad 100 (Step S15=NO), the display control device 200 ends the item selection processing shown in FIG. 5.

When determination is made that a selection item is included in the search area (Step S14=YES), the display control device 200 determines whether or not there is a plurality of selection items through the cursor coordinate controller 220 (Step S17).

As a result, when determination is made that the number of selection items included in the search area is solely one (Step S17=NO), the display control device 200 selects the selection item as the movement destination of the cursor through the cursor coordinate controller 220 (Step S18), and then, ends the item selection processing shown in FIG. 5.

When determination is made that there is a plurality of selection items included in the search area (Step S17=YES), the display control device 200 compares the distances from the position coordinates of the reference point of the cursor in the operation direction of the touch pad 100 for the selection items (Step S19).

Then, when there is solely one selection item at the shortest distance subjected to comparison in previous Step S19 (Step S20=YES), the display control device 200 selects the selection item as the movement destination of the cursor (Step S21), and then, ends the item selection processing shown in FIG. 5.

When there is a plurality of selection items at the shortest distance subject to comparison in previous Step S19 (Step S20=NO), the display control device 200 compares the distances from the position coordinates of the reference point of the cursor in the direction perpendicular to the operation direction of the touch pad 100 for the selection items (Step S22).

Then, when there is solely one selection item at the shortest distance subjected to comparison in previous Step S22 (Step S23=YES), the display control device 200 selects the selection item as the movement destination of the cursor (Step S24), and then, ends the item selection processing shown in FIG. 5.

When there is a plurality of selection items at the shortest distance subjected to comparison in previous Step S22 (Step S23=NO), the display control device 200 compares the distances from the position coordinates of the origin of the cursor in the direction perpendicular to the operation direction of the touch pad 100 for the selection items (Step S25).

Then, the display control device 200 selects the selection item at the shortest distance subjected to comparison in previous Step S25 as the movement destination of the cursor (Step S26), and then, ends the item selection processing shown in FIG. 5.

Next, operation of the display control device 200 of the embodiment will be described below, in particular, focusing on operation in a case of selecting a selection item to be the movement destination of the cursor R through an operation on the touch pad 100. In the following description shown in FIGS. 6A, 6B, 7A, and 7B, it is assumed that a selection item to which the cursor is set and a selection item to be the movement destination of the cursor are shown by different kinds of hatching from each other.

Figure 6A:
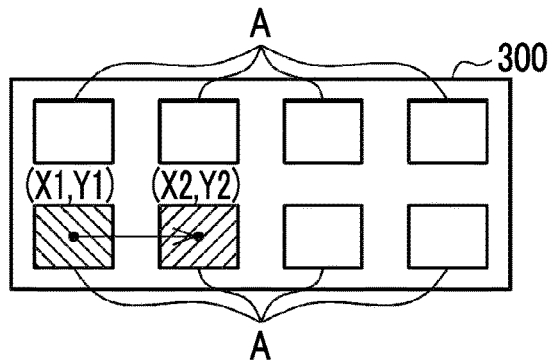
FIG. 6A is a schematic view showing an example of synchronous operation between a touch pad and a display device that is executed by a display control device of a comparative example.
Figure 6A:
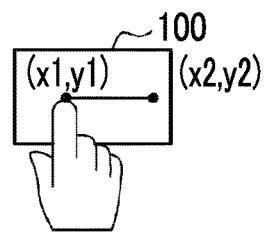

As shown in FIG. 6A, in the related art, in a case of performing selection of a selection item to be the movement destination of the cursor through an operation on the touch pad 100, there is a need to adjust an operation amount of the touch pad 100 in order to move the position of the cursor from a current position to a position overlapping a desired selection item A.

That is, in order to make the position of the cursor overlap the desired selection item A, when the current position coordinates of the reference point of the cursor are a point (X1,Y1), and position coordinates of a center position of the selection item A as the movement destination are a point (X2,Y2), the operator needs to not only operate the touch pad 100 in the right direction in order to move the cursor in the right direction, but also adjust the operation amount of the touch pad 100 in order to make the amount of movement of the cursor be "|X2−X1|".

However, the operation of the touch pad 100 is not necessarily always satisfactory in terms of operability for the operator. In particular, when the operator is a driver who is driving the vehicle, since it is difficult for the operator to operate the touch pad 100 with accuracy, there is a demand particularly for improvement of operability of the touch pad 100.

Figure 6B:
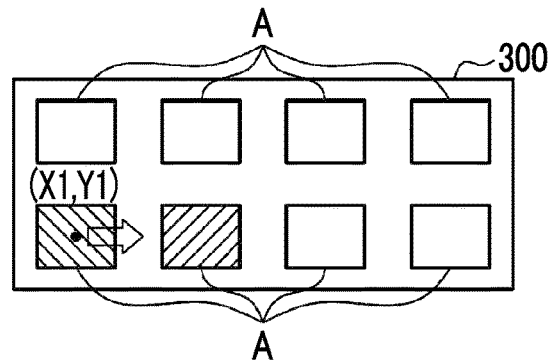
FIG. 6B is a schematic view showing an example of synchronous operation between the touch pad and the display device that is executed by the display control device of the first embodiment.
Figure 6B:
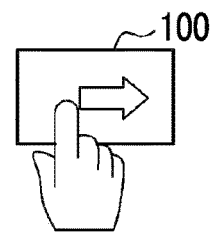

From this, as shown in FIG. 6B, in the embodiment, in a case of performing selection of a selection item A to be the movement destination of the cursor through an operation on the touch pad 100, a relative position of a desired selection item viewed from the position of the cursor is visually recognized, and then, the operation direction of the touch pad 100 toward the desired selection item A is input. That is, in an example shown in the drawing, among the selection items A displayed on the display device 300, when the current position of the cursor is a selection item A at a lower left corner and the desired selection item A is a right-hand selection item A, the touch pad 100 is operated in the right direction. At this time, the operation amount of the touch pad 100 in the right direction does not necessarily need to correspond to the distance between adjacent selection items A in the right-left direction. For this reason, the operator may visually recognize the positional relationship of the selection items A displayed on the display device 300, and may specify the operation direction of the touch pad 100 based on the relative positional relationship between the selection item A to which the cursor is set at the present time and the selection item A that is assumed as the movement destination of the cursor. For this reason, it is possible to select the selection item A to be the movement destination of the cursor through an intuitive operation on the touch pad 100.

As described above, according to the first embodiment, it is possible to obtain the following effects.

(1) When the position of the cursor displayed on the display device 300 is moved through an operation on the touch pad 100, a selection item to be the movement destination of the cursor is selected based on the positional relationship between the operation direction of the touch pad 100 and each selection item displayed on the display device 300. For this reason, there is no need to adjust the operation amount of the touch pad 100 in selecting the selection item to be the movement destination of the cursor. With this, it is possible to improve operability in a case of selecting a selection item to be the movement destination of the cursor through an operation on the touch pad 100.

(2) Even when an operation on the touch pad 100 is slightly shifted, since a restriction is applied to the direction output to the cursor coordinate controller 220 as the operation direction of the touch pad 100, it is possible to allow the operator to intuitively perform the movement of the cursor displayed on the display device 300.

Second Embodiment

Next, a second embodiment of a display control device will be described referring to the drawings. The second embodiment is different from the first embodiment in that a display area of selection items in a display device is into a plurality of display areas. Accordingly, in the following description, a configuration different from the first embodiment will be primarily described, and in regard to a configuration the same as or similar to the first embodiment, overlapping description will not be repeated.

Figure 7A:
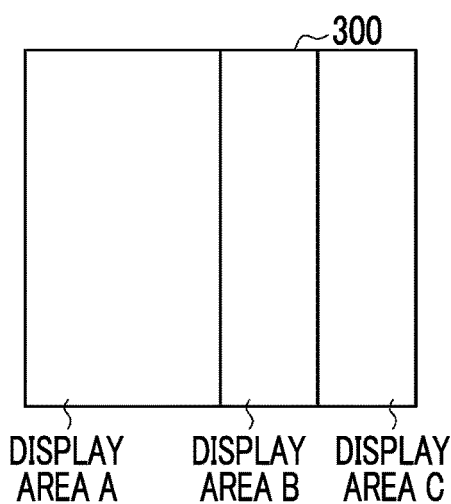
FIG. 7A is a schematic view showing an example of a setting mode of a display area of a selection item in a second embodiment of a display control device.
Figure 7B:
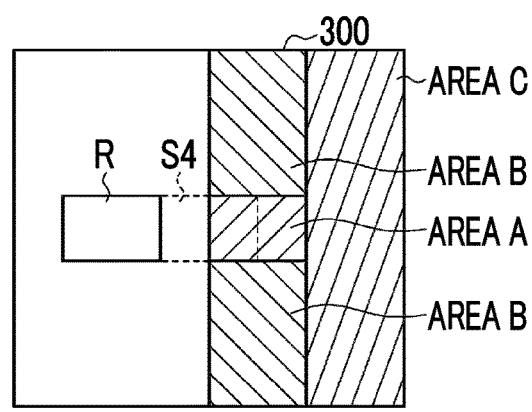
FIG. 7B is a schematic view illustrating an example of an order of search for each area in the setting mode of the display area shown in FIG. 7A.

As shown in FIG. 7A, in the embodiment, the display area of the selection items in the display device 300 is divided into three display areas in the right-left direction, and the display areas are arranged in an order of a display area A, a display area B, and a display area C from the left. Then, as shown in FIG. 7B, in the example, it is assumed that the operation direction of the touch pad 100 is the right direction, and a search area S4 set on the right side of the cursor R extends over the display area A and the display area B. At this time, the cursor coordinate controller 220 sets an area A under a condition that no selection item is included in an area overlapping the display area A in the search area S4. The area A is an area corresponding to the search area S4 set on the right side of the cursor R in the up-down direction in the display area B, and extends over the entire display area B in the right-left direction. The cursor coordinate controller 220 sets other areas positioned to sandwich the area A in the up-down direction in the display area B as areas B. The cursor coordinate controller 220 sets, as an area C, the display area C adjacent to the display area B on an opposite side to the display area A when viewed from the display area B. Then, when no selection item is included in the area overlapping the display area A in the search area S4 set on the right side of the cursor R, the cursor coordinate controller 220 determines the presence or absence of a selection item in an order of the area A, the areas B, and the area C. When a plurality of selection items is included in each area, similarly to the first embodiment, the cursor coordinate controller 220 selects the selection item to be the movement destination of the cursor R according to the procedures of (A) to (C).

Next, operation of the display control device 200 of the embodiment will be described below, in particular, focusing on operation in a case of selecting a selection item to be the movement destination of the cursor R through an operation on the touch pad 100. In the following description shown in FIGS. 8A, 8B, 9A, and 9B, it is assumed that a selection item to which the cursor is set and a selection item to be the movement destination of the cursor are shown by different kinds of hatching from each other.

Figure 8A:
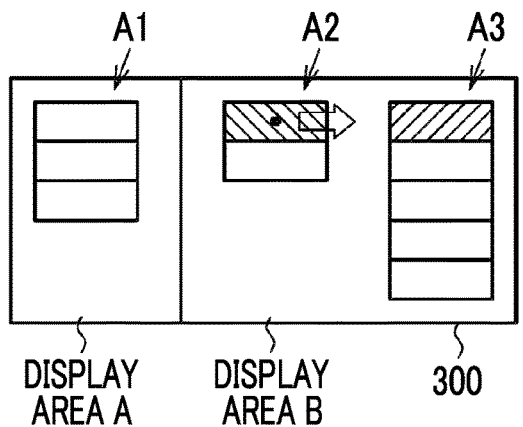
FIG. 8A is a schematic view showing an example of a process in which the display control device of the second embodiment moves a cursor among selection items displayed on the display device.
Figure 8B:
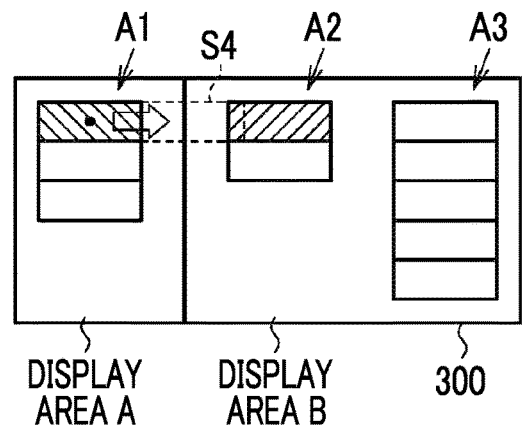
FIG. 8B is a schematic view showing an example of a process in which the display control device of the second embodiment moves the cursor among the selection items displayed on the display device.

FIGS. 8A and 8B show an example of the arrangement of the selection items displayed on the display device 300. In the example shown in the drawings, three item column groups extending in the up-down direction are arranged in parallel in the right-left direction, and the item column groups are arranged in an order of a first item column group A1, a second item column group A2, and a third item column group A3 from the left. In the example, the display area of the display device 300 is divided into a display area A corresponding to the first item column group A1 and a display area B corresponding to the second item column group A2 and the third item column group A3. Then, a boundary line of the display areas extending in the up-down direction is set between the first item column group A1 and the second item column group A2.

Then, in the example shown in FIG. 8A, the cursor is set to a selection item that is positioned on the uppermost side of the second item column group A2. Then, when the touch pad 100 is operated in the right direction from this state, the position of the cursor moves to a selection item on the uppermost side of the third item column group A3 that is positioned on the right side of the cursor.

In the example shown in FIG. 8B, the cursor is set to the selection item that is positioned on the uppermost side of the first item column group A1. Then, when the touch pad 100 is operated in the right direction from this state, the search area S4 that is set in the right direction to be the operation direction of the touch pad 100 based on the cursor extends over the display area A and the second display area B. At this time, since no selection item is included in the area overlapping the first display area A in the search area S4, the presence or absence of a selection item is searched from an area corresponding to the search area S4 in the up-down direction in the second display area B. As a result, the selection item on the uppermost side of the second item column group A2 among the selection items displayed in the second display area B is selected as the movement destination of the cursor.

In this way, in the embodiment, even when the display area of the selection items in the display device 300 is divided into a plurality of display areas, it is possible to realize the movement of the cursor R extending over the display areas through an operation on the touch pad 100.

Figure 9A:
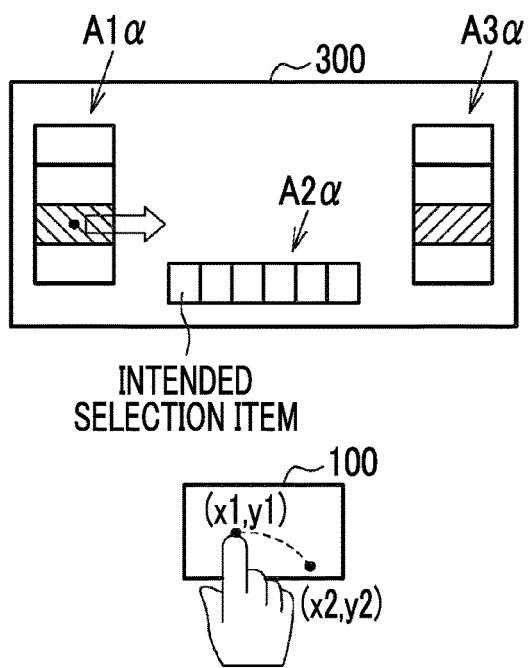
FIG. 9A is a schematic view showing an example of a process in which the display control device of the comparative example moves a cursor among selection items displayed on the display device.
Figure 9B:
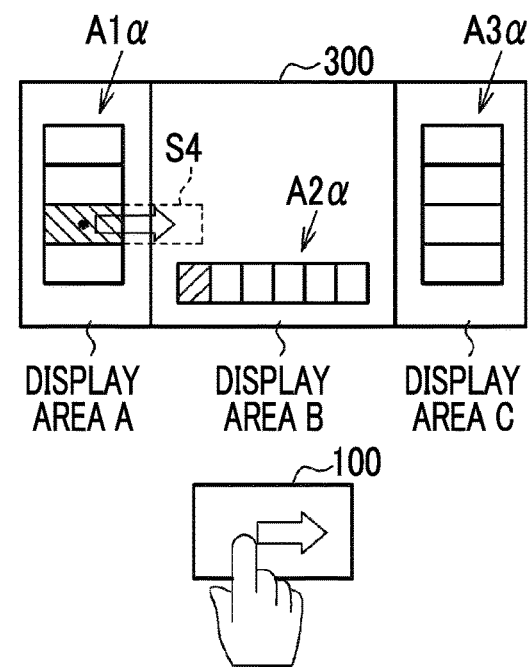
FIG. 9B is a schematic view showing an example of a process in which the display control device of the second embodiment moves the cursor among the selection items displayed on the display device.

FIGS. 9A and 9B show another example of the arrangement of the selection items displayed on the display device 300. In the example shown in the drawings, two item column groups extending in the up-down direction are arranged in parallel in the right-left direction, and one item column group extending in the right-left direction is arranged between the item column groups. Then, the item column groups are arranged in an order of a first item column group A1α, a second item column group A2α, and a third item column group A3α from the left. In the example, the second item column group A2α is positioned from the bottom of the lowermost item of the first item column group A1α. That is, in the example, the degree of freedom for the arrangement of the selection items is increased compared to the example shown in FIGS. 8A and 8B.

At this time, the example shown in FIG. 9A corresponds to a comparative example, and as in the first embodiment, there is solely one display area of selection items in the display device 300. In the example, the cursor is set to a selection item that is positioned second below the first item column group A1α. Then, when a selection item that is positioned at a left end of the second item column group A2α is about to be selected as the movement destination of the cursor, the operator operates the touch pad 100 obliquely right downward.

However, even when the touch pad 100 is operated obliquely right downward, as in the first embodiment, in a configuration in which the operation amount of the touch pad 100 is decomposed into the component in the up-down direction and the component in the right-left direction and the direction corresponding to the relatively large component is corrected as the operation direction of the touch pad 100, so-called cursor jumping to a selection item of the third item column group A3α that is positioned on the right side of the cursor occurs. That is, in the configuration of the first embodiment, in a case where the degree of freedom for the arrangement of the selection items is increased, even when the current position of the cursor is close to the position of an intended selection item, the position of the cursor is not necessarily simply moved.

In contrast, the example shown in FIG. 9B corresponds to the embodiment, and the display area of the selection items in the display device 300 is divided into a plurality of display areas. In the example, the first item column group A1α corresponds to the display area A, the second item column group A2α corresponds to the display area B, and the third item column group A3α corresponds to the display area C. Then, in the example, when selecting a selection item that is positioned at the left end of the second item column group A2α close to the current position of the cursor obliquely right downward, the touch pad 100 is operated intuitively in the right direction based on the relative positional relationship between the current position of the cursor and a selection item to be the movement destination of the cursor in the right-left direction. With this, the search area S4 that is set in the right direction to be the operation direction of the touch pad 100 based on the cursor R extends over the display area A and the display area B. At this time, since no selection item is included in an area overlapping the display area A in the search area S4, a selection item is searched from other areas of the display area B. Then, a selection item that is closest to the position coordinates of the reference point of the cursor in the right-left direction to be the operation direction of the touch pad 100 in the display area B, and is positioned at the left end of the second item column group A2α is selected as the movement destination of the cursor.

In this way, in the embodiment, even when the degree of freedom for the layout of the selection items in the display device 300 is increased, selection of a selection item to be the movement destination of the cursor is realized through an intuitive operation on the touch pad 100 while the occurrence of so-called cursor jumping is suppressed.

As described above, according to the second embodiment, in addition to the effects of the first embodiment, it is possible to obtain the following effects.

(3) In a case where a search area extends over a plurality of display areas, when a display area on a side on which the cursor is positioned is a first display area, and a display area on a side on which the cursor is not positioned is a second display area, the cursor coordinate controller 220 moves the position of the cursor from the first display area to the second display area under a condition that, among the selection items displayed in the first display area, no selection item is included in the search area. With this, when a search area that is set in the operation direction of the touch pad 100 based on the cursor extends over a plurality of display areas, it is possible to suppress the movement of the position of the cursor over the display areas against an operator's intention.

(4) When the position of the cursor moves from the first display area to the second display area, the cursor coordinate controller 220 determines the presence or absence of a selection item from an area where the search area and the second display area overlap each other, and when determination is made that no selection item is included, determines the presence or absence of a selection item from other areas of the second display area. For this reason, when the position of the cursor moves over the display areas, even when the position of the cursor in a display area before movement is slightly deviated from the position of a selection item in a display area after movement in the direction perpendicular to the operation direction of the touch operation unit, a phenomenon, so-called cursor jumping, in which the cursor jumps over a selection item intended by the operator in the display area after movement hardly occurs. With this, it is possible to improve operability in a case of selecting a selection item to be the movement destination of the cursor through an operation on the touch pad 100 while increasing the degree of freedom for the layout of the selection items displayed on the display device 300.

(5) When the position of the cursor moves from the first display area to the second display area, the cursor coordinate controller 220 determines the presence or absence of a selection item in order from an area at a position close to an area where the search area and the second display area overlap each other, in the direction perpendicular to the operation direction of the touch pad 100. With this, when the position of the cursor moves over the display areas, it is possible to perform selection of a selection item in the display area after movement in order from an area that is highly likely to conform to the operator's intention.

(6) When the position of the cursor moves from the first display area to the second display area, the cursor coordinate controller 220 determines the presence or absence of a selection item from areas other than the area where the search area and the second display area overlap each other, in the second display area. Even when an operation on the touch pad 100 is slightly shifted, the operation information acquisition unit 210 applies a restriction to the direction output to the cursor coordinate controller 220 as the operation direction of the touch pad 100. Then, with a combination of the above-described configurations, even when a restriction is applied to the direction input as the operation direction of the touch pad 100, a phenomenon, so-called cursor jumping, in which, when the display area of the display device 300 is divided into a plurality of display areas, the cursor jumps over a selection item intended by the operator in the display area after movement hardly occurs. For this reason, it is possible to intuitively perform the movement of the cursor displayed on the display device 300 while increasing the degree of freedom for the layout of the selection items displayed on the display device 300.

OTHER EMBODIMENTS

The embodiments may be carried out in the following forms.

In the embodiments, the operation information acquisition unit 210 decomposes the operation amount acquired from the touch pad 100 into the component in the up-down direction and the component in the right-left direction. However, a combination of the directions in decomposing the operation amount of the touch pad 100 is not necessarily a combination of the up-down direction and the right-left direction, and two directions along the operation surface of the touch pad 100 that intersect to each other can be employed as a combination of the directions in decomposing the operation amount of the touch pad 100.

In the embodiments, the operation information acquisition unit 210 decomposes the operation amount acquired from the touch pad 100 into a component in a first direction and a component in a second direction, and a direction corresponding to a relatively large operation amount out of the operation amounts in the first and second directions is corrected as the operation direction of the touch pad 100. However, the operation information acquisition unit 210 may output a direction of a vector toward the position coordinates of the operation end with the position coordinates of the operation start of the touch pad 100 as a starting point as the operation direction of the touch pad 100 to the cursor coordinate controller 220, without correcting the operation direction of the touch pad 100.

In the second embodiment, when a search area extends over a plurality of display areas, the cursor coordinate controller 220 divides the second display area as the display area where the cursor is not positioned into an area corresponding to the search area in the direction perpendicular to the operation direction of the touch pad 100 and areas positioned on both sides in the direction perpendicular to the operation direction of the touch pad 100 when viewed from the area, and performs determination of a selection item in order for the areas. However, the cursor coordinate controller 220 may divide the second display area into areas in the direction perpendicular to the operation direction of the touch pad 100 more finely. In this case, it is preferable that, with the area corresponding to the search area in second display area in the direction perpendicular to the operation direction of the touch pad 100 as a starting point, the cursor coordinate controller 220 performs determination of a selection item in order from an area close to the area in the direction perpendicular to the operation direction. According to the above-described configuration, it is possible to perform selection of a selection item in the second display area in order from an area that is highly likely to conform to the operator's intention.

In the second embodiment, when a search area extends over a plurality of display areas, the cursor coordinate controller 220 performs determination of a selection item not only for an area corresponding to the search area in the direction perpendicular to the operation direction of the touch pad 100 in the second display area as the display area where the cursor is not positioned, but also for other areas of the second display area. Alternatively, when a search area extends a plurality of display areas, when determination is made that no selection item is included in the area corresponding to the search area in the direction perpendicular to the operation direction of the touch pad 100 in the second display area, the cursor coordinate controller 220 may move a target of determination of a selection item to adjacent display areas in the operation direction of the touch pad 100, without performing determination of a selection item for other areas of the second display area.

In the embodiment, when there is a plurality of selection items closest to the position coordinates of the reference point of the cursor R in the direction perpendicular to the operation direction of the touch pad 100, the cursor coordinate controller 220 selects a selection item closest to the position coordinates of the origin of the cursor R in the direction perpendicular to the operation direction of the touch pad 100 among the selection items as the movement destination of the cursor R. Alternatively, when there is a plurality of selection items closest to the position coordinates of the reference point of the cursor R in the direction perpendicular to the operation direction of the touch pad 100, the cursor coordinate controller 220 may select a selection item as the movement destination of the cursor R in order from a selection item that is positioned on a side (for example, in a case where the operation direction of the touch pad 100 is the right direction, an upper side or a lower side) set in advance in the direction perpendicular to the operation direction of the touch pad 100 when viewed from the reference point of the cursor R.

In the embodiments, when there is a plurality of selection items closest to the position coordinates of the reference point of the cursor R in the operation direction of the touch pad 100, the cursor coordinate controller 220 selects a selection item closest to the position coordinates of the reference point of the cursor R in the direction perpendicular to the operation direction of the touch pad 100 among the selection items as the movement destination of the cursor R. Alternatively, when there is a plurality of selection items closest to the position coordinates of the reference point of the cursor R in the operation direction of the touch pad 100, the cursor coordinate controller 220 may select a selection item as the movement destination of the cursor R in order from a selection item that is positioned on a side (for example, in a case where the operation direction of the touch pad 100 is right direction, an upper side or a lower side) set in advance in the direction perpendicular to the operation direction of the touch pad 100 when viewed from the reference point of the cursor R.

In the embodiments, not only when all of the selection items are included in the search area, but also when solely a part of the selection items is included in the search area, the cursor coordinate controller 220 determines that a selection item is included in the search area. Alternatively, the cursor coordinate controller 220 may determine that a selection item is included in the search area solely when all of the selection items are included in the search area.

In the embodiments, the center point of the cursor is applied as the reference point of the cursor; however, other points may be set as the reference point of the cursor as long as the points are within the cursor. In regard to the origin of the cursor, similarly, other points may be set as the origin of the cursor as long as points are different from the reference point of the cursor set as described above in the direction perpendicular to the operation direction of the touch pad 100 among points on the cursor.

In the embodiments, a case where the shape of a selection item displayed on the display device 300 is a rectangular shape has been described as an example. However, as the shape of a selection item, for example, other shapes, such as a circular shape or a polygonal shape, may be employed.

In the embodiments, as a particularly preferred example, a configuration in which the display control device 200 is mounted in the vehicle has been described as an example; however, the display control device 200 may be applied for uses other than the vehicle.

What is claimed is:

1. A display control device that controls selection of a plurality of selection items displayed on a display device disposed remotely from a touch operation unit based on operation information input from the touch operation unit, the display control device comprising:
 a display control processor configured to:
  acquire an operation direction of the touch operation unit as the operation information from the touch operation unit;
  based on the acquired operation information, select a selection item from among the plurality of selection items displayed on the display device, and set a cursor that designates an operation target to the selected selection item;
  when the cursor is set to a predetermined selection item of the plurality of selection items and when, based on a position of the cursor on a display surface of the display device, the selection item is included in a search area that is set in a direction corresponding to the operation direction included in the operation information on the display surface, select a selection item of the plurality of selection items at a position closest to a reference point of the cursor in the direction corresponding to the operation direction as the selection item to be a movement destination of the cursor;
  when multiple selection items of the plurality of selection items are located within the determined search area, select one selection item of the multiple selection items based on a closest distance from each selection item to an origin point determined by the operation information input into the touch operation unit, the origin point designating an initial position of the cursor prior to movement set forth in the operation information;
  when multiple selection items of the plurality of selection items are located at the position closest to the reference point of the cursor in the operation direction:
   calculate a distance on the display surface between the reference point of the cursor and a selection item of the multiple selection items in a direction perpendicular to the direction corresponding to the operation direction on the display surface for the plurality of selection items, and
   select a selection item of the multiple selection items that is at a shortest calculated distance as the selection item to be the movement destination of the cursor; and
  when multiple selection items of the plurality of selection items are located at the shortest distance from the reference point of the cursor in the direction perpendicular to the direction corresponding to the operation direction on the display surface:
   set an origin of the cursor to a position different from the reference point in the direction perpendicular to the direction corresponding to the operation direction on the display surface for the plurality of selection items, and
   select a selection item of the multiple selection items that is at a shortest distance on the display surface from the origin of the cursor in the direction perpendicular to the direction corresponding to the operation direction as the selection item to be the movement destination of the cursor.

2. The display control device according to claim 1, wherein the display control processor is configured to, when multiple selection items of the plurality of selection items are located at the position closest to the reference point of the cursor in the operation direction, select a selection item of the multiple selection items that is positioned in a predetermined direction in a direction perpendicular to the direction corresponding to the operation direction on the display surface as the selection item to be the movement destination of the cursor for the plurality of selection items.

3. The display control device according to claim 1, wherein the display control processor is configured to:
   acquire an operation amount in a first direction and an operation amount in a second direction intersecting the first direction from the touch operation unit; and
   output a direction corresponding to a largest operation amount out of the operation amounts in the first and second directions as the direction corresponding to the operation direction of the touch operation unit.

4. A display control device that controls selection of a plurality of selection items displayed on a display device disposed remotely from a touch operation unit based on operation information input from the touch operation unit, the display control device comprising:
   a display control processor configured to:
      acquire an operation direction of the touch operation unit as the operation information from the touch operation unit;
      based on the acquired operation information, select a selection item from among the plurality of selection items displayed on the display device, and set a cursor that designates an operation target to the selected selection item;
      when the cursor is set to a predetermined selection item of the plurality of selection items and when, based on a position of the cursor on a display surface of the display device, the selection item is included in a search area that is set in a direction corresponding to the operation direction included in the operation information on the display surface, select a selection item of the plurality of selection items at a position closest to a reference point of the cursor in the direction corresponding to the operation direction as the selection item to be a movement destination of the cursor; and
      when multiple selection items of the plurality of selection items are located within the determined search area, select one selection item of the multiple selection items based on a closest distance from each selection item to an origin point determined by the operation information input into the touch operation unit, the origin point designating an initial position of the cursor prior to movement set forth in the operation information, wherein:
   a display area of the selection items in the display device is divided into a plurality of display areas,
   when, based on the position of the cursor on the display surface of the display device, the search area that is set in the direction corresponding to the operation direction on the display surface extends over the plurality of display areas, and when, among the plurality of display areas, a display area on a side on which the cursor is positioned is a first display area and a display area on a side on which the cursor is not positioned is a second display area, the display control processor is configured to move the position of the cursor from the first display area to the second display area when no selection item is included in the search area among selection items of the plurality of selection items displayed in the first display area, and
   when the position of the cursor is moved from the first display area to the second display area, the display control processor is configured to determine a presence or absence of the selection item from an area where the search area and the second display area overlap each other, and upon determining that no selection item is included, the display control processor is configured to determine the presence or absence of the selection item from other areas of the second display area.

5. The display control device according to claim 4, wherein the display control processor is configured to:
   perform the determination regarding the presence or absence of the selection item in the second display area for each of a plurality of areas set by dividing the second display area in a direction perpendicular to the direction corresponding to the operation direction, and
   when the position of the cursor is moved from the first display area to the second display area, determine the presence or absence of the selection item in order from an area at a position closest to the area where the search area and the second display area overlap each other in the direction perpendicular to the direction corresponding to the operation direction.

* * * * *

UNITED STATES PATENT AND TRADEMARK OFFICE
CERTIFICATE OF CORRECTION

| | | Page 1 of 1 |
|---|---|---|
| PATENT NO. | : 10,866,693 B2 | |
| APPLICATION NO. | : 15/821413 | |
| DATED | : December 15, 2020 | |
| INVENTOR(S) | : Shoji Kakinuma et al. | |

It is certified that error appears in the above-identified patent and that said Letters Patent is hereby corrected as shown below:

On the Title Page

Item (73) should be changed from:
"(73) Assignees: TOYOTA JIDOSHA KABUSHIKI KAISHA, Toyota (JP); AISIN AW CO., LTD., Anjo (JP); PANASONIC CORPORATION, Kadoma (JP); HARMAN INTERNATIONAL INDUSTRIES, INCORPORATED, Stamford, CT (US)"

To the following:
--(73) Assignees: TOYOTA JIDOSHA KABUSHIKI KAISHA, Toyota (JP); PANASONIC CORPORATION, Kadoma (JP); HARMAN INTERNATIONAL INDUSTRIES, INCORPORATED, Stamford, CT (US)--

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*